UNITED STATES PATENT OFFICE.

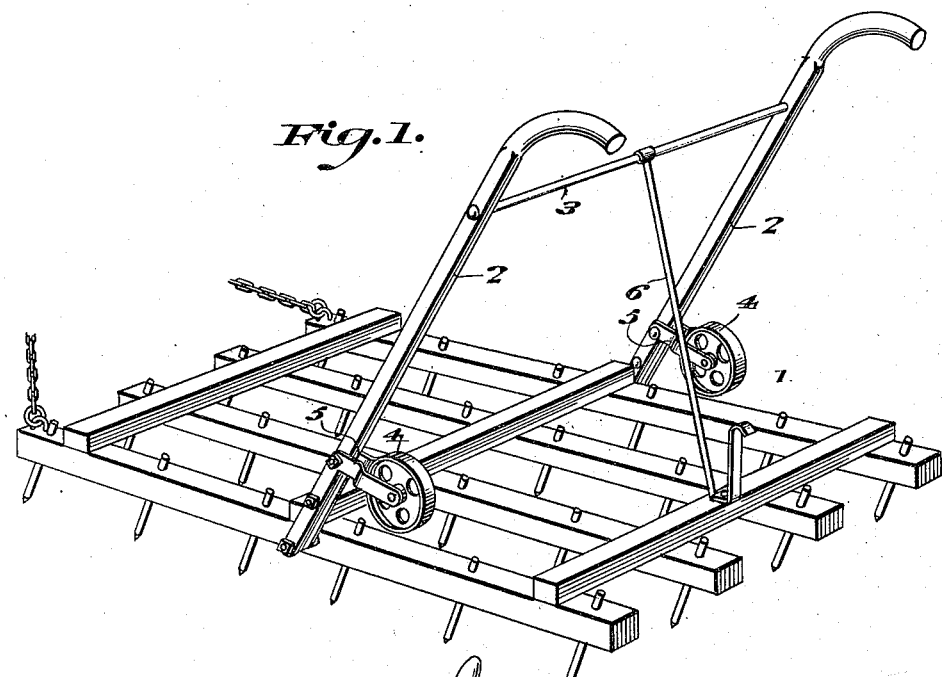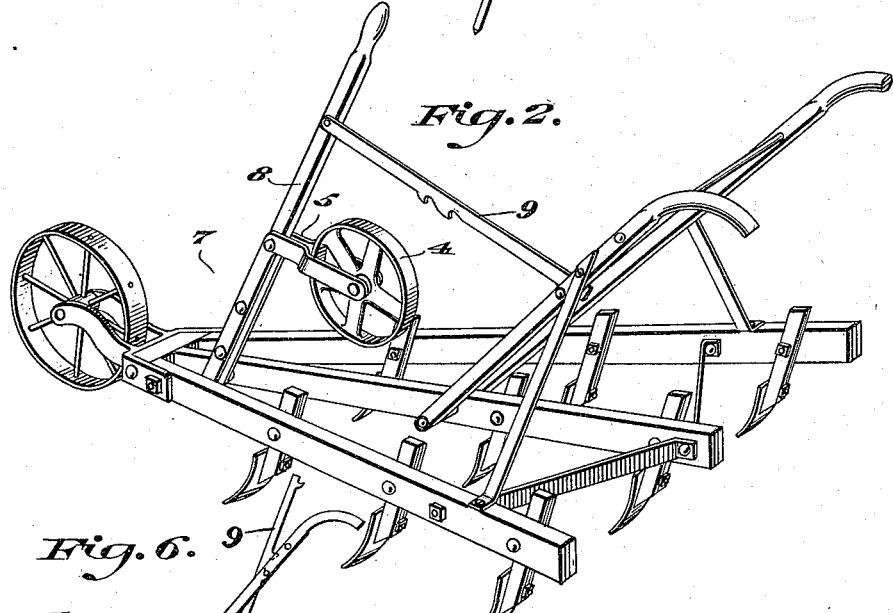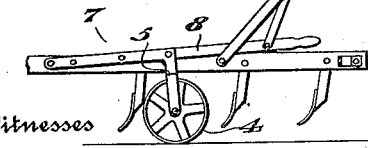

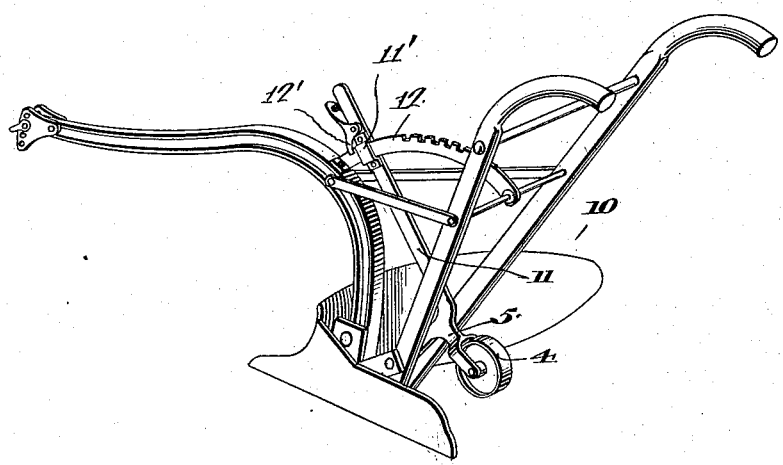
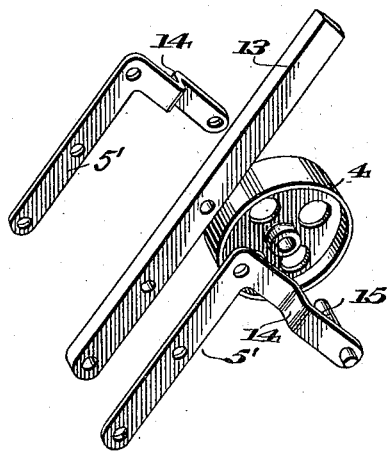
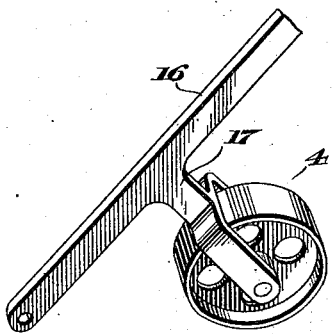

LATHAN L. POWERS, OF DUNGANNON, VIRGINIA.

LIFTER FOR AGRICULTURAL IMPLEMENTS.

1,159,269.  Specification of Letters Patent.  Patented Nov. 2, 1915.

Application filed March 21, 1914. Serial No. 826,256.

*To all whom it may concern:*

Be it known that I, LATHAN L. POWERS, a citizen of the United States, residing at Dungannon, in the county of Scott and State of Virginia, have invented new and useful Improvements in Lifters for Agricultural Implements, of which the following is a specification.

The primary intention of the invention is to facilitate the control of agricultural implements such as harrows, cultivators, plows and the like, whereby the same may be elevated from the ground at a moment's notice without requiring the stopping of the team so that obstructions may be avoided, the turning of the implement made easy and the transporting of the same facilitated as well as to clear the implement of any trash or other accumulation which would tend to impair its efficiency or increase the task of the operator.

The invention consists of a runner, preferably a wheel and a lever having such runner attached thereto and pivotally connected to the implement and under control of the operator to be depressed at its free end to bring the runner in contact with the ground and effect a lifting of the implement, such lever being adapted to be secured in either a depressed or elevated position so that both hands of the operator may be free to manipulate the implement and handle the team.

The invention consists of the novel features, details of construction and combination of parts, which hereinafter will be more particularly set forth, illustrated and claimed.

In the drawings hereto attached:—Figure 1 is a perspective view showing the application of the invention to a harrow. Fig. 2 is a perspective view showing the application of the invention to a cultivator. Fig. 3 is a perspective view showing the application of the invention to a plow. Fig. 4 is a detail view in perspective of the invention showing the parts separated. Fig. 5 is a modification. Fig. 6 is a side view of the implement illustrated in Fig. 2 showing the same on a smaller scale.

Corresponding and like parts are referred to in the following description, and indicated in all the views of the drawing, by the same reference characters.

The various implements illustrated are of ordinary construction and are typical of the types to which the invention is to be applied.

In the application illustrated in Fig. 1 the harrow 1 is provided with two levers 2 which are pivoted at their lower ends to the frame or side bars of the harrow. A cross piece 3 connects the upper ends of the levers 2. A runner 4 is mounted upon each of the levers 2 and is located near the pivotal end thereof and is adapted to be brought in contact with the ground so as to effect a lifting of the implement, whereby the teeth may be elevated so as to clear the ground for any purpose such as to avoid roots or stones or to enable the implement to be turned or to be moved over the ground without causing the teeth to operate in the ordinary way. The runner 4 in the preferable form consists of small wheels which are mounted in standards 5 projecting from the levers 2. The levers 2 in the present instance constitute handlebars. A brace 6 is connected with the cross piece 3 and resting at its lower end on the frame of the harrow serves as means to hold the levers in their required position, when the lifter is not required in use.

In the adaptation illustrated in Fig. 2 the implement 7 consists of a cultivator to which a lever 8 is pivoted at its lower end, said lever being provided with a runner 4 which is similar in construction and arrangement to the corresponding part illustrated in Fig. 1, such runner being a wheel and mounted in a standard 5. The lever 8 has a brace 9 attached thereto such brace serving to hold the lever in the required adjusted position.

Fig. 3 shows an ordinary turning plow 10. A lever 11 is pivoted at its lower end to the lower portion of the plow standard and is provided with a runner 4 which is carried by a standard 5 in the manner hereinbefore described. The lever 11 is provided with a runner 11' surrounding and guided by a curved brace 12 provided as shown with teeth to be engaged by a thumb latch 12' carried by said lever for holding the lever in adjusted position. When the free end of the lever 11 is moved rearwardly the runner 4 is brought in contact with the ground and results in a lifting of the plow thereby enabling the same to be turned or moved with ease over the ground, since the load is sustained by the runner 4.

It is proposed to construct the standard 5 either as a part of the lever or independently thereof and attached thereto. In the construction shown most clearly in Fig. 4 the lever 13 consists of a bar of wood and a standard comprising two similar members which are braced against opposite sides of the lever 13 and secured thereto. Each of said members is of L-shape, one part being placed against a side of the lever or bar 13 and the other part projecting therefrom at a right angle and having an off set 14, whereby the lower ends of such off standing parts are spaced apart to receive the runner 4 which is mounted upon a pin 15 supported in openings formed in the lower ends of the off standing parts of the members.

In the modification shown in Fig. 5 the lever 16 and standard 17 are formed together and consist of parts of a metal bar. It is to be understood that the standard 17 may be welded to the lever or bar 16 so as to form in effect a part thereof.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the invention as claimed.

The several levers will be provided with means for holding them in the required adjusted position as indicated in the several views.

Having thus described the invention, what is claimed as new is:—

In combination with an agricultural implement, a lever pivoted at one end to the implement, L-shaped standard forming members on opposite sides of the lever and having parts projecting therefrom about at a right angle and offset in their length, and a runner secured between the offset parts of the members.

In testimony whereof I affix my signature in presence of two witnesses.

LATHAN L. POWERS.

Witnesses:
B. T. MOODY,
A. C. ELLIOTT.